United States Patent
Yamamoto et al.

(10) Patent No.: US 7,985,294 B2
(45) Date of Patent: Jul. 26, 2011

(54) OPTICAL DEVICE AND METHOD OF MANUFACTURING THE SAME

(75) Inventors: Futoshi Yamamoto, Tokyo (JP); Katsutoshi Kondou, Tokyo (JP); Junichiro Ichikawa, Tokyo (JP); Masaru Nakamura, Tsukuba (JP); Sunao Kurimura, Tokyo (JP); Shunji Takekawa, Tokyo (JP); Kenji Kitamura, Tokyo (JP)

(73) Assignees: Sumitomo Osaka Cement Co., Ltd., Tokyo (JP); National Institute for Materials Science, Tsukuba, Ibaraki (JP)

( * ) Notice: Subject to any disclaimer, the term of this patent is extended or adjusted under 35 U.S.C. 154(b) by 0 days.

(21) Appl. No.: 11/367,261

(22) Filed: Mar. 3, 2006

(65) Prior Publication Data

US 2007/0014014 A1    Jan. 18, 2007

(30) Foreign Application Priority Data

Mar. 4, 2005    (JP) .................................. 2005-061101

(51) Int. Cl.
*C30B 29/30*    (2006.01)

(52) U.S. Cl. ............. 117/4; 117/2; 117/3; 117/8; 117/9; 117/944

(58) Field of Classification Search .............. 117/2, 3.4, 117/8, 9, 944
See application file for complete search history.

(56) References Cited

U.S. PATENT DOCUMENTS

| | | | | |
|---|---|---|---|---|
| 5,432,881 A | * | 7/1995 | Doi | 385/132 |
| 5,437,761 A | | 8/1995 | Koide | |
| 5,473,722 A | * | 12/1995 | Sohler et al. | 385/132 |
| 6,021,947 A | * | 2/2000 | Swartz | 235/472.01 |
| 6,925,211 B2 | * | 8/2005 | Burns et al. | 385/2 |

FOREIGN PATENT DOCUMENTS

| | | |
|---|---|---|
| JP | 6-087698 A | 3/1994 |
| JP | 6-258539 A | 9/1994 |
| JP | 7-128624 A | 5/1995 |
| JP | 9-061769 A | 3/1997 |
| JP | 9-178942 A | 7/1997 |
| JP | 2000-233997 | 8/2000 |
| JP | 2003-177258 | 6/2003 |

OTHER PUBLICATIONS

Nozawa, T., et al., Water Vapor Effects on Titanium Diffusion into LiNbO3 Substrates, Japanese Journal of Applied Physics, vol. 29, No. 10, Oct. 1990, pp. 2180-2185.

(Continued)

*Primary Examiner* — Robert M Kunemund
(74) *Attorney, Agent, or Firm* — Chapman and Cutler LLP

(57) ABSTRACT

An optical device and a method of manufacturing the optical device, with the method including the steps of forming a dopant layer on a stoichiometric lithium niobate single crystal substrate with Li to Nb mole composition ratio of 49.5% to 50.5%, and diffusing a dopant in the dopant layer into at least a portion of the stoichiometric lithium niobate single crystal substrate. The stoichiometric lithium niobate single crystal substrate includes 0.5 to 5 mol % of Mg. In the diffusing step, a heat treatment is performed at a diffusion temperature of 1000° C. to 1200° C. for a diffusion time of 3 hours to 24 hours in a dry atmosphere of at least one of $O_2$, $N_2$, Ar and He gas having a dew-point temperature of −35° C. or less.

7 Claims, 7 Drawing Sheets

OTHER PUBLICATIONS

Nishihara, H., et al., Optical Integrated Circuits, revised and enlarged edition, Ohmsha, Ltd., Jul. 25, 1999, pp. 172-174.

Oka, T., et al., Wavelength Dependability of Ti Diffused Optical Waveguides in Stoichiometric LiNbO3, Lecture Handbook, The 63rd Meeting, The Japan Society of Applied Physics and Related Societies, Niigata University, Sep. 2002.

Yamauchi, H., et al., Influence of Outdiffusion of Li2O by Diffusion Atmosphere in Stoichiometric LiNbO3, Lecture Handbook, The 50th Meeting, The Japan Society of Applied Physics and Related Societies, Kanagawa University, Mar. 2003.

AML/NIMS, Waseda University, Relation Between Ti Concentration and Refractive Index in Ti-Doped Near-Stoichiometric LiNbO3 Crystals, Lecture Handbook, The 50th Meeting, The Japan Society of Applied Physics and Related Societies, Kanagawa University, No. 3, p. 1258, Mar. 2003.

* cited by examiner

OPTICAL DEVICE AND METHOD OF MANUFACTURING THE SAME

BACKGROUND OF THE INVENTION

1. Technical Field

The present invention relates to an optical device and a method of manufacturing the same, and more particularly, to an optical device in which a crystal substrate is heated at a high temperature of 1000° C. or more when a dopant is diffused into a stoichiometric lithium niobate crystal, and a method of manufacturing the same.

2. Related Art

Conventionally, in an optical device such as an optical switch or an optical modulator, an optical device using a substrate having an electrooptic effect is provided. As the substrate having an electrooptic effect, for example, lithium niobate, lithium tantalate, PLZT (lead lanthanum zirconate titanate), quartz-based material, and a combination thereof can be used. In particular, lithium niobate ($LiNbO_3$; hereinafter, referred to as LN) crystal having a high electrooptic effect is preferably used.

A CLN crystal substrate which is a LN crystal substrate having congruent melting composition in which crystal and melt co-exist with the same composition in equilibrium is used as the substrate used in the optical device. In the CLN crystal, the mole fraction of Li is 48.5 mol % with respect to Li and Nb.

On the other hand, the LN crystal substrate in which the mole composition ratio of Li to Nb is at least 48.5 mol %, more preferably, 49.5 to 50.5 mol %, and a Curie temperature measured using a differential thermal analysis (DTA) or a differential scanning calorimetry (DSC) is about 1200° C., which is higher than 1150° C. of a general CLN, is called a stoichiometric or SLN crystal substrate (hereinafter, referred to as SLN). Since the SLN crystal has higher electrooptic effect than that of the CLN crystal, as disclosed in Patent Document 1 (Japanese Unexamined Patent Application Publication No. 2003-177258 is an example of related art), when the SLN crystal is used as an optical device, a device length is short and an operation voltage is low and thus it is possible to provide an optical device having excellent integration. In addition, when an optical waveguide is formed in the SLN crystal, confinement of light is strong, and thus, when the SLN crystal is used in the optical modulator, a structure having high efficiency in refractive index change due to applying an electric field can be designed.

In general, when the LN crystal is heated at a high temperature of, for example, 650° C. or more, out-diffusion of $Li_2O$ constituting LN occurs. In a region in which the out-diffusion occurs, a refractive index of extraordinary light increases ($\Delta ne/\Delta C(mol \%) = -0.016$. Here, $\Delta ne$ denotes a change in the refractive index and $\Delta C$ denotes a change in the mole fraction of Li).

An optical device, and more particularly, a device using a refractive index difference between a dopant diffusion portion and a non-diffusion portion needs to be designed for anticipating increase of the refractive index of the diffusion portion and the change in the refractive index of the non-diffusion portion and thus manufacture reproducibility is difficult. In addition, in a case of a waveguide type device, a whole or partial slab waveguide occurs and confinement of light wave in the waveguide becomes weaker due to the increase of the surface refractive index.

It is effective to increase a vapor pressure of $Li_2O$ during the heat treatment in order to suppress the out-diffusion of $Li_2O$, and a method of simultaneously introducing powdered $Li_2O$ and LN into a heating device or a method of sealing the LN crystal with a material (for example, platinum or high-purity quartz) which does not react with LN even under a high temperature is known. In addition, a method of performing the heat treatment in an oxygen atmosphere containing water vapor, that is, a wet atmosphere, to suppress the out-diffusion and to obtain a high-quality waveguide having low propagation loss is disclosed in Non-patent Document 1 (Hiroshi Nishihara et al., "Optical integrated circuit", revised and enlarged edition, Ohmsha, Ltd., Jul. 25, 1999, p 172-174) and Non-patent Document 2 (T. Nozawa, H. Miyazawa and S. Miyazawa: "Water vapor effects on titanium diffusion into $LiNbO_3$ substrates", Jpm. J. Appl. Phys., vol. 29, No 10, pp 2180-2185). Since control of a water vapor pressure is simpler than control of the vapor pressure of $Li_2O$, the heat treatment in the wet atmosphere is generally employed in manufacturing the LN optical waveguide.

When an optical waveguide is formed on a SLN crystal substrate by thermally diffusing Ti, as disclosed in Patent Document 1 or Non-patent Document 3, a diffusion coefficient of the SLN crystal is smaller than that of the CLN crystal. In Patent Document 1, a Ti film of 70 nm is formed on the surface of the SLN crystal substrate by electron beam evaporation and thermally diffused at a diffusion temperature of 1000° C. to 1060° C. for a diffusion time of 6 to 24 hours in an oxygen atmosphere containing water vapor. For example, when the diffusion is performed at a diffusion temperature of 1030° C. for 10 hours, an optical waveguide having a depth of 1.6 μm is formed in the Z-plate SLN crystal substrate.

In Non-patent Document 3 (Takahiro Oka et al., "Wavelength dependency of a Ti diffusion waveguide in stoichiometric lithium niobate crystal", proceedings of 63th applied physics association lecture meeting, p. 1045, September, 2002), when a deposited Ti film (190 nm) is formed in the SLN crystal and diffused at a diffusion temperature of 1060° C. for a diffusion time of 48 to 192 hours in a wet-$O_2$ atmosphere, an optical waveguide having a depth of about 5 μm is formed.

When the optical waveguide is formed using the SLN crystal substrate as described above, the diffusion temperature or the diffusion time when diffusing a dopant into the substrate needs to become greatly higher or longer than those of the CLN crystal substrate.

However, even in the SLN crystal, the out-diffusion of $Li_2O$ occurs upon the heat treatment of a high temperature, similar to the CLN crystal. When the SLN substrate is used, since the temperature of the heat treatment required for manufacturing the optical waveguide is high or the time thereof is long, the change in the refractive index due to the out-diffusion of $Li_2O$ more increases. Since the refractive index of the whole substrate surface increases depending on the temperature or the time, the whole substrate surface may become the slab waveguide. When the dopant is thermally diffused or when the heat treatment is performed in order to compensate for process distortion by heating at a high temperature, the refractive index of the substrate surface needs to be suppressed from increasing.

A relationship between the heating time of the CLN or SLN and the increase of the refractive index is disclosed in Non-Patent Document 4 (Hiroshi Yamauchi, et al., "Influence of out-diffusion of $Li_2O$ in stoichiometric lithium niobate crystal in a diffusion atmosphere", proceedings of 50th applied physics association lecture meeting, p. 1258, 2003). In addition, the "relationship between the heating time and the change in the refractive index of extraordinary light at a diffusion temperature of 1030° C. in a wet-$O_2$ atmosphere" disclosed in Non-patent document 4 is shown in Table 1.

TABLE 1

Relationship between heating time and change in refractive index of extraordinary light

| | Change in refractive index of extraordinary light ($\Delta n_e$) | | |
|---|---|---|---|
| | 45 h | 75 h | 120 h |
| CLN (condition A) | $1 \times 10^{-4}$ or less | $1 \times 10^{-4}$ or less | $5 \times 10^{-4}$ |
| SLN (condition A) | $3 \times 10^{-4}$ | $3 \times 10^{-4}$ | $5 \times 10^{-4}$ |
| CLN (condition B) | $1 \times 10^{-3}$ | $2 \times 10^{-3}$ | $3 \times 10^{-3}$ |
| SLN (condition B) | $1 \times 10^{-3}$ | $2 \times 10^{-3}$ | $3 \times 10^{-3}$ |

Condition A: sealing into Pt-box
Condition B: No sealing

In addition, Mg:SLN crystal in which Mg is doped into the SLN crystal has higher electrooptic effect and lower nonstoichiometric defect and is stronger against optical damage, compared with the SLN crystal. However, the diffusion coefficient of the dopant of the Mg:SLN crystal is lower than that of the SLN crystal. Accordingly, in the heat treatment for thermally diffusing the dopant into the Mg:SLN crystal, a heating temperature and a heating time more increase than those of the SLN crystal. Thus, the above-mentioned problems become serious and a manufacturing cost increases.

The invention provides a optical device having high quality, excellent productivity and optical characteristics, and capable of suppressing a refractive index of a substrate surface from increasing when a dopant is thermally diffused into, or a heat treatment is performed in order to compensate for process distortion in stoichiometric lithium niobate crystal or a crystal substrate in which Mg is doped into the crystal, and a method of manufacturing the optical device.

SUMMARY OF THE INVENTION

The present inventors found a fact that it is possible to manufacture a low-loss optical waveguide which is capable of suppressing the increase of the refractive index of extraordinary light of a substrate surface upon a heat treatment by applying test conditions which contradict common knowledge to stoichiometric lithium niobate crystal and a crystal substrate in which Mg is doped into the crystal. In addition, by the research of the present inventors, it was found that optical waveguides having different strengths of TE and TM light confinement are formed in an Mg:SLN crystal substrate using a Ti diffusion method and an optical device such as an optical modulator having a good extinction function of polarized wave can be manufactured by the present method, without employing, for example, an optical polarizer. In other words, the invention is characterized as follows:

According to a first aspect of the invention, there is provided a method of manufacturing an optical device including the steps of forming a dopant layer on a substantial stoichiometric lithium niobate single crystal substrate; and diffusing a dopant in the dopant layer into at least a portion of the substantial stoichiometric lithium niobate single crystal substrate, and wherein, in the diffusing step, a heat treatment is performed at a diffusion temperature of 1000° C. to 1200° C. in an atmosphere in which a gas having a dew-point temperature of 0° C. or less is introduced, preferably for a diffusion time of 3 hours or more, and more preferably for a diffusion time of 3 hours to 24 hours.

Here, the "substantial stoichiometric lithium niobate single crystal substrate" means the LN crystal substrate in which the mole composition ratio of Li to Nb is at least 48.5 mol %, more preferably, 49.5 to 50.5 mol %, and a Curie temperature measured using a differential thermal analysis (DTA) or a differential scanning calorimetry (DSC) is about 1200° C., which is higher than 1150° C. of a general CLN. In the present specification, when an explanatory note is not appended, the stoichiometric lithium niobate or the SLN is intended to mean the substantial stoichiometric lithium niobate.

According to a second aspect of the invention, there is provided the method of manufacturing an optical device according to the first aspect, wherein the substantial stoichiometric lithium niobate single crystal substrate may contain 0.5 to 5 mol % of Mg.

According to a third aspect of the invention, there is provided the method of manufacturing an optical device according to the first or second aspect, wherein the dopant layer may be composed of at least one selected from a group consisting of Ti, Zn, Ta, Nb, Er, Yb, Ni, Mg, Sc, Cu, and Fe.

According to a fourth aspect of the invention, there is provided an optical device including a substantial stoichiometric lithium niobate single crystal substrate and an optical waveguide formed on the substantial stoichiometric lithium niobate single crystal substrate, wherein the optical waveguide is formed by forming a dopant layer on a substantial stoichiometric lithium niobate single crystal substrate; and diffusing a dopant in the dopant layer into at least a portion of the substantial stoichiometric lithium niobate single crystal substrate, wherein, in the diffusing step, a heat treatment is performed at a diffusion temperature of 1000° C. to 1200° C. in an atmosphere in which a gas having a dew-point temperature of 0° C. or less is introduced, preferably for a diffusion time of 3 hours or more, and more preferably for a diffusion time of 3 hours to 24 hours.

According to a fifth aspect of the invention, there is provided the optical device according to the fourth aspect, wherein the substantial stoichiometric lithium niobate single crystal substrate may contain 0.5 to 5 mol % of Mg.

According to a sixth aspect of the invention, there is provided the optical device according to the fourth or fifth aspect, wherein the dopant layer may be composed of at least one selected from a group consisting of Ti, Zn, Ta, Nb, Er, Yb, Ni, Mg, Sc, Cu, and Fe.

According to a seventh aspect of the invention, there is provided the optical device according to the sixth aspect, wherein the dopant layer may contain Ti.

According to an eighth aspect of the invention, there is provided the optical device according to the seventh aspect, wherein a polarized wave having an extraordinary light component may be used.

According to a ninth aspect of the invention, there is provided a method of manufacturing an optical device including the step of performing a heat treatment on a substantial stoichiometric lithium niobate single crystal substrate at a heating temperature of 1000° C. to 1200° C. in an atmosphere in which a gas having a dew-point temperature of 0° C. or less is introduced in order to remove or reduce process distortion.

According to a tenth aspect of the invention, there is provided the optical device according to the ninth aspect, wherein the substantial stoichiometric lithium niobate single crystal substrate may contain 0.5 to 5 mol % of Mg.

In the first aspect of the invention, when the dopant is diffused into the stoichiometric lithium niobate crystal, the diffusion is performed at the temperature of 1000° C. or more in the dry atmosphere in which the gas having a dew-point temperature of 0° C. or less is introduced. Thus, it is possible to suppress the increase of the refractive index due to the out-diffusion of $Li_2O$ to thereby prevent the surface from becoming waveguide state, when compared with the conventional wet atmosphere containing water vapor. Because of the feature, complicate design for anticipating the increase of the refractive index of a non-diffusion portion is unnecessary and good manufacture reproducibility can be obtained. Even in a waveguide type device, in addition to the good confinement of the light wave, it is possible to suppress irregularities of the waveguide surface and to obtain a high-quality optical waveguide having excellent optical characteristics and low propagation loss. Accordingly, by the invention, since it is possible to more increase the heating temperature, compared with the prior art, it is possible to decrease the heating time and to suppress a production lead time and a cost from increasing.

In the second aspect of the invention, when the substantial stoichiometric lithium niobate single crystal substrate is doped with 0.5 to 5 mol % of Mg, the electrooptic effect or the optical damage is more improved, compared with the stoichiometric lithium niobate crystal in which Mg is not doped. In addition, it is possible to manufacture a more improved optical device by applying the manufacturing method of the invention.

In the third aspect of the invention, with respect to Ti, Zn, Ta, Nb, Er, Yb, Ni, Mg, Sc, Cu, and Fe as the dopant, the manufacturing method of the invention can be preferably applied to efficiently realize thermal diffusion.

In the fourth aspect of the invention, the optical device includes a substantial stoichiometric lithium niobate single crystal substrate and an optical waveguide formed on the substantial stoichiometric lithium niobate single crystal substrate, wherein the optical waveguide is formed by forming a dopant layer on a substantial stoichiometric lithium niobate single crystal substrate; and diffusing a dopant in the dopant layer into at least a portion of the substantial stoichiometric lithium niobate single crystal substrate, and, in the diffusing step, a heat treatment is performed at a diffusion temperature of 1000° C. to 1200° C. in an atmosphere in which a gas having a dew-point temperature of 0° C. or less is introduced. Therefore, it is possible to provide a high-quality optical device having an optical waveguide, in which the change in the refractive index of a non-diffusion portion does not occur, design and manufacture thereof are easy, and optical characteristics are excellent like the first aspect of the invention. Since the heat treatment is performed for a diffusion time of 3 hours or more, and preferably 3 hours to 24 hours, it is possible to provide an optical device having excellent productivity.

In the fifth aspect of the invention, since the substantial stoichiometric lithium niobate single crystal substrate contains 0.5 to 5 mol % of Mg, the electrooptic effect or the optical damage is more improved, compared with the non-doped stoichiometric lithium niobate crystal. Therefore, it is possible to provide an optical device having excellent optical characteristics.

In the sixth aspect of the invention, with respect to Ti, Zn, Ta, Nb, Er, Yb, Ni, Mg, Sc, Cu, and Fe as the dopant, the manufacturing method of the invention can be preferably applied to efficiently realize thermal diffusion. Thus, it is possible to provide an optical device having excellent optical characteristics and productivity.

In the seventh aspect of the invention, it is possible to efficiently diffuse Ti as the dopant into the substantial stoichiometric lithium niobate single crystal substrate in which Mg is doped and to obtain a low-loss optical waveguide like the first aspect of the invention. Thus, it is possible to provide a device having sufficient low insertion loss. In addition, since the change in the refractive index of the non-diffusion portion does not occur, it is possible to suppress crosstalk of light through a slab waveguide and thus to obtain a device such as an optical modulator having a large ON/OFF extinction ratio.

In the eighth aspect of the invention, the light confinement strengths of a TE mode and a TM mode of the optical waveguide are different from each other. Thus, when a Z-cut crystal substrate is employed, a spot diameter by the light confinement of the TE mode more increases than that of the TM mode and thus it is possible to obtain a high-value optical modulator which is capable of modulating only an extraordinary light component, without loading a polarizer. Accordingly, it is possible to suppress a production cost and to provide an optical device which can be easily used.

In the ninth aspect of the invention, since the heat treatment is performed on a substantial stoichiometric lithium niobate single crystal substrate at a heating temperature of 1000° C. to 1200° C. in an atmosphere in which a gas having a dew-point temperature of 0° C. or less is introduced, it is possible to remove or reduce process distortion including composition fluctuation and disturbance in crystal array due to a mechanical process such as polishing or cutting, a chemical etching process, or a dry etching process, without causing the change in the refractive index of the substrate. Accordingly, complicate design for anticipating the increase of the refractive index at the time of manufacturing an optical device is unnecessary, and it is possible to manufacture an optical device capable of maintaining original excellent characteristics of the substantial stoichiometric lithium niobate single crystal substrate.

In the tenth aspect of the invention, when the substantial stoichiometric lithium niobate single crystal substrate is doped with 0.5 to 5 mol % of Mg, the electrooptic effect or the optical damage is more improved, compared with the stoichiometric lithium niobate crystal in which Mg is not doped. In addition, it is possible to manufacture a more improved optical device by applying the manufacturing method of the invention.

BRIEF DESCRIPTION OF THE DRAWINGS

FIG. 5 is a micrograph of a surface of a channel-type waveguide of Example 1a;

DESCRIPTION OF THE PREFERRED EMBODIMENTS

Figure 1:
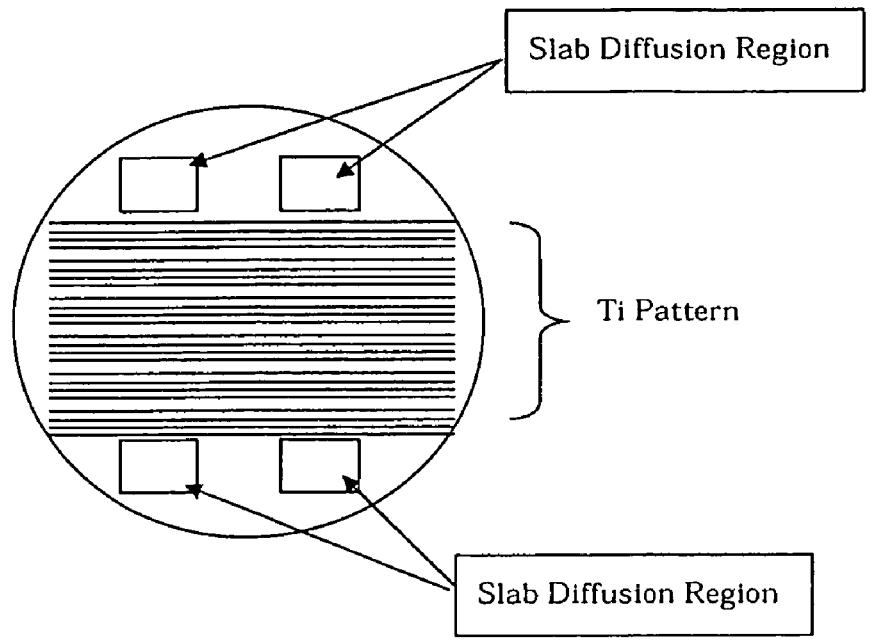
FIG. 1 is a view showing a pattern on a wafer used in a test on an optical device according to the present invention.

Hereinafter, exemplary embodiments of the present invention will be described in detail.

The present invention is characterized in that a dopant is diffused in a dry state (dry atmosphere) in a method of diffusing the dopant into stoichiometric lithium niobate crystal to manufacture an optical device. In particular, the dry state of the present invention means that a diffusion temperature is 1000° C. or more and a gas having a dew-point temperature of 0° C. or less, more preferably −35° C. or less is introduced.

In the stoichiometric lithium niobate (SLN) used in the manufacturing method according to the present invention, a mole fraction of lithium/niobium is substantially 1 and the mole composition ratio of the lithium is in a range of 49.5 to 50.5%. In addition, in order to increase the electrooptic effect of the SLN crystal and suppress the optical damage or nonstoichiometric defect thereof, Mg:SLN crystal in which Mg is doped into the SLN crystal is preferably used.

A dosage of Mg is preferably 0.5 to 5 mol % with respect to a total number of moles of Li and Nb. When the dosage is less than 0.5 mol %, the electrooptic effect or the optical damage is not improved and, when the dosage is greater than 5 mol %, strong striation (growth striation) or sub-grain is apt to appear at the time of growing the crystal. Furthermore, crack or breaking is apt to occur.

As the dopant used in the manufacturing method according to the present invention, Ti, Zn, Ta, Nb, Er, Yb, Ni, Mg, Sc, Cu, and Fe are preferably used. These materials are used for improving optical characteristics of the substrate surface or changing the refractive index of the substrate surface when an optical waveguide is formed in a SLN crystal substrate.

In particular, Ti, Zn, and Ni can increase the refractive index of the surface of the SLN substrate. In addition, these dopants can increase the refractive indexes of both ordinary light and extraordinary light and thus be preferably used for manufacturing the optical waveguide. Zn, Mg, and Sc can improve optical damage resistance characteristics, and Er and Yb become active ion sources of laser oscillation. Since Fe and Cu can increase photorefractive effect, Fe and Cu can be used for forming a diffraction grating. Since Ta and Nb can reduce the refractive index of a diffusion portion, Ta and Nb are used in a method using a non-diffusion portion as a waveguide.

Now, a method of manufacturing the optical device will be described.

SLN crystal or Mg:SLN crystal is manufactured using the double-crucible-type Czochralski method of a fully-automatic material supplying system disclosed in the above-mentioned Patent Document 1 or Patent Document 2 (Japanese Unexamined Patent Application Publication No. 2000-233997 is an example of related art).

Next, a wafer of an X-cut plate or Z-cut plate is cut out of the SLN crystal or the Mg:SLN crystal to prepare a substrate.

In order to diffuse a dopant into the SLN crystal substrate or Mg:SLN crystal substrate, the dopant is attached to the substrate surface by electron beam evaporation or sputtering method (that is, a dopant layer is formed). The thickness of the attached dopant (dopant layer) depends on the amount of the dopant diffused into the substrate surface. In addition, when a channel-type optical waveguide or the like is formed, a photolithography method or a lift-off process is performed in order to attach the dopant in a predetermined pattern.

Next, the substrate attached with the dopant is set in a reaction device and heated at a temperature of 1000° C. or more in a dry atmosphere to diffuse the dopant into the substrate (that is, the dopant in the dopant layer is diffused into the substrate). When the substrate is set in the reaction device, it is possible to use a support member such as a box made of platinum or a quartz boat.

In order to realize the dry state, $O_2$, $N_2$, Ar, He, or the like is introduced into the reaction device such that a dew-point temperature is controlled to 0° C. or less at an atmosphere pressure. The above-mentioned gases can be obtained in a state that the gases are charged in a high-pressure container with high purity and at a very low dew-point temperature, and can be introduced into the reaction device while maintaining the low dew-point temperature by paying attention to a tube or a regulator. The dew-point temperature, that is, moisture content contained in the introduced gas, is controllable by a temperature upon bubbling. In the present invention, the dew-point temperature is less than 0° C. and the dew-point temperature of 0° C. can be easily obtained by using water containing ice upon bubbling and cooling the gas introducing tube. In order to more increase the dew-point temperature, the gas may be bubbled in warm water.

When the dew-point temperature is higher than 0° C., it is impossible to efficiently suppress out-diffusion of $Li_2O$ and the refractive index of the surface of the crystal substrate greatly becomes higher. In addition, although it is extremely difficult to introduce the gas into the reaction device in a state that the dew-point temperature is less than −70° C., the suppression of the out-diffusion is not more improved, compared with a case where the dew-point temperature is −35° C. A lower limit value of the dew-point temperature is not specially limited.

Although a diffusion temperature which is a heating temperature of the substrate may be preferably 1000° C. or more, the diffusion temperature is preferably in a range of 1025° C. to 1180° C., in view of suppressing the increase of the diffusion time (the reaction is aimed to be completed in 24 hours which is an average diffusion time related to a typical production of the CLN crystal substrate). Furthermore, the time consumed for heating the substrate depends on a diffusion temperature and a diffusion depth (about 2 μm to 10 μm) of the optical waveguide to be formed. When the diffusion temperature is in a range of 1000 to 1200° C., the time consumed for forming the optical waveguide having a diffusion depth of about 4 μm is 3 hours or more, and more specifically about 3 to 48 hours. As mentioned above, in consideration of the productivity of the optical device, the heating time is preferably set to within 24 hours.

As mentioned above, according to the method of the invention, since the refractive index of the substrate surface due to the out-diffusion of $Li_2O$ can be suppressed from increasing by performing the dopant diffusion in the dry atmosphere, complicate design for anticipating the increase of the refractive index at the time of manufacturing the optical device is unnecessary and the dopant can be diffused at a higher temperature for a shorter time, compared with the prior art.

On the other hand, the method of the present invention may be applied as a heat treatment performed when process distortion due to a mechanical process such as polishing and cutting, a chemical etching process, and a dry etching process is removed, in addition to the diffusion of the dopant. Such heat treatment may be applied in any process for manufacturing a device. In this case, the heat treatment may be performed in an atmosphere in which a gas having a dew-point of 0° C. or less is introduced at a temperature range of 1000° C. to 1200° C. Accordingly, since the out-diffusion of $Li_2O$ can be reduced, it is possible to suppress the refractive index of the substrate surface from increasing.

EXAMPLES

The method of manufacturing an optical device according to the present invention was employed and the increase of the refractive index of a non-diffusion portion and the diffusion state of a dopant were tested and evaluated.

Examples 1a and 1b

A slab diffusion region having a width of 1 cm×1 cm and a photoresist film having line-shaped patterns each having a width of 3.0 to 8.5 μm were formed on an Mg:SLN crystal substrate of a Z-cut 3-inch wafer (Mg:SLN containing 1.8 mol % of Mg; made by Hitachi metals, Ltd. or Mg:SLN containing 1.0 mol % of Mg made by Taki chemical Co., Ltd) and a Ti film having a thickness of 70 nm to 120 nm was attached to a gap between the line-shaped patterns using electron beam evaporation (see FIG. 1).

Next, the photoresist film was removed, the crystal substrate was set in a quartz tube reaction furnace device using a quartz boat as a support member, and synthetic air obtained by mixing high-purity oxygen and nitrogen gas having a dew-point temperature of −35° C. was fed to the reaction device. The inner temperature of the reaction device was controlled to 1080° C. and maintained for the diffusion time of 23 hours. Thereafter, the inner temperature of the reaction device was uncontrolled until an ordinary temperature to prepare optical devices of Example 1a (using the Mg:SLN substrate containing 1.8 mol % of Mg) and Example 1b (using the Mg:SLN substrate containing 1.0 mol % of Mg).

Comparative Example 1a

An optical device of Comparative example 1a which is similar to Example 1a except that a dew-point temperature is 50° C. and an Mg:SLN crystal substrate (containing 1.8 mol % of Mg; made by Hitachi metals, Ltd.) is used was prepared.

Comparative Example 1b

An optical device of Comparative example 1b which is similar to Example 1a except that a dew-point temperature is 17° C. and an Mg:SLN crystal substrate (containing 1.8 mol % of Mg; made by Hitachi metals, Ltd.) is used was prepared.

Example 2

An optical device of Example 2 which is similar to Example 1 except that a 3-inch non-doped SLN crystal substrate (made by Oxide Corporation) is used was prepared.

Comparative Example 2

An optical device of Comparative example 2 which is similar to Example 2 except that a dew-point temperature is 50° C. and a diffusion temperature is 1060° C. was prepared.

Comparative Examples 3a and 3b

Optical devices of Comparative examples 3a and 3b which are similar to Example 1a except that 3-inch CLN crystal substrates (made by CTI Corporation) are used, dew-point temperatures are −35° C. and 50° C., respectively, a diffusion temperature is 1000° C., and a diffusion time is 20 hours were prepared.

Test Method 1

The result of measuring by the prism coupling method the refractive indexes of the surfaces of non-dopant diffusion portions of the prepared tested bodies (for example, the optical devices of Example 1a to Comparative example 3b) before and after a heat treatment was shown in Table 2. The refractive index (ne) of extraordinary light which has a measurement wavelength of 633 nm and is sensitive to the change in the out-diffusion of $Li_2O$ was measured.

TABLE 2

| | Crystal substrate | Diffusion temperature (° C.) | Dew-point temperature (° C.) | Before heat treatment | After heat treatment | Change in refractive index (Δne) |
|---|---|---|---|---|---|---|
| Example 1a | 1.8 mol % Mg:SLN | 1080 | −35 | 2.1895 | 2.1895 | $1 \times 10^{-4}$ or less (Detection limit) |
| Example 1b | 1.0 mol % Mg:SLN | 1080 | −35 | 2.1889 | 2.1890 | $1 \times 10^{-4}$ or less (Detection limit) |
| Comparative example 1a | 1.8 mol % Mg:SLN | 1080 | 50 | 2.1895 | 2.1906 | $11 \times 10^{-4}$ |
| Comparative example 1b | 1.8 mol % Mg:SLN | 1080 | 17 | 2.1895 | 2.1902 | $7 \times 10^{-4}$ |
| Example 2 | SLN | 1080 | −35 | 2.1911 | 2.1910 | $1 \times 10^{-4}$ or less (Detection limit) |
| Comparative example 2 | SLN | 1060 | 50 | 2.1912 | 2.1930 | $18 \times 10^{-4}$ |
| Comparative example 3a | CLN | 1000 | 50 | 2.2028 | 2.2029 | $1 \times 10^{-4}$ or less (Detection limit) |
| Comparative example 3b | CLN | 1000 | −35 | 2.2028 | 2.2042 | $14 \times 10^{-4}$ |

As can be seen from the result shown in Table 2, when the SLN crystal substrate or Mg:SLN crystal substrate is used, the increase of the refractive index at the time of the heat treatment is low in the dry atmosphere and high in the wet atmosphere. In contrast, in a case of the CLN substrate, the increase of the refractive index at the time of the heat treatment is high in the dry atmosphere and low in the wet atmosphere.

In addition, it can be seen that, in the SLN crystal substrate (Example 2) and the Mg:SLN crystal substrate (Examples 1a and 1b), the increase of the refractive index of the substrate surface due to the out-diffusion of $Li_2O$ is less than a detection limit at the dew-point temperature of −35° C. or less, and the increase of the refractive index due to the heat treatment is efficiently suppressed.

Test Method 2

Figure 2:
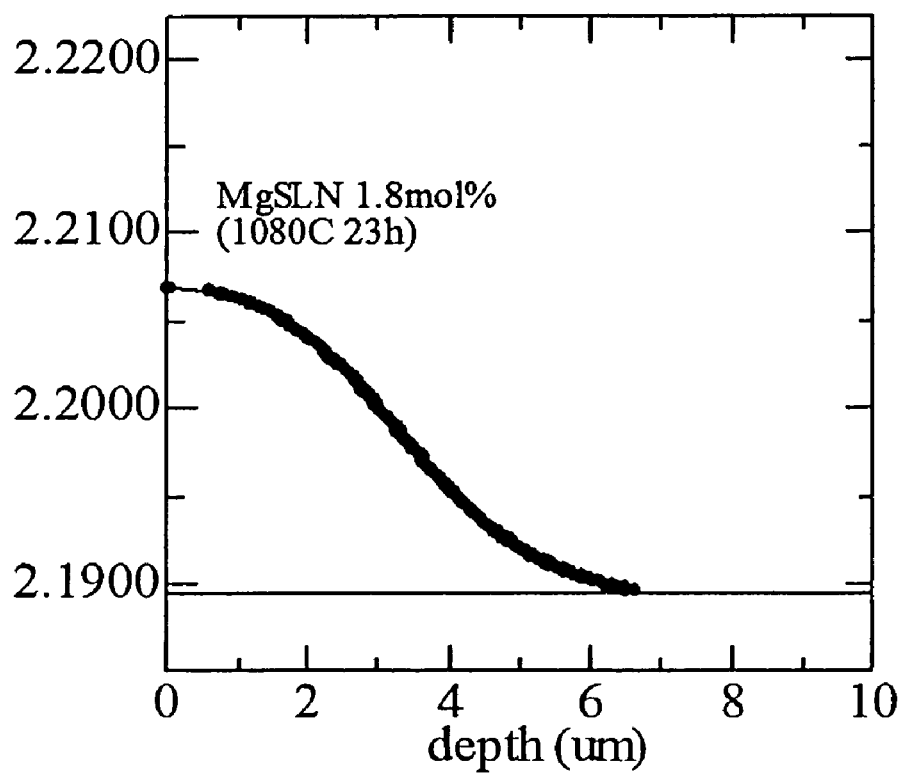
FIG. 2 shows a refractive-index distribution related to an optical device (Example 1a) according to the present invention.
Figure 3:
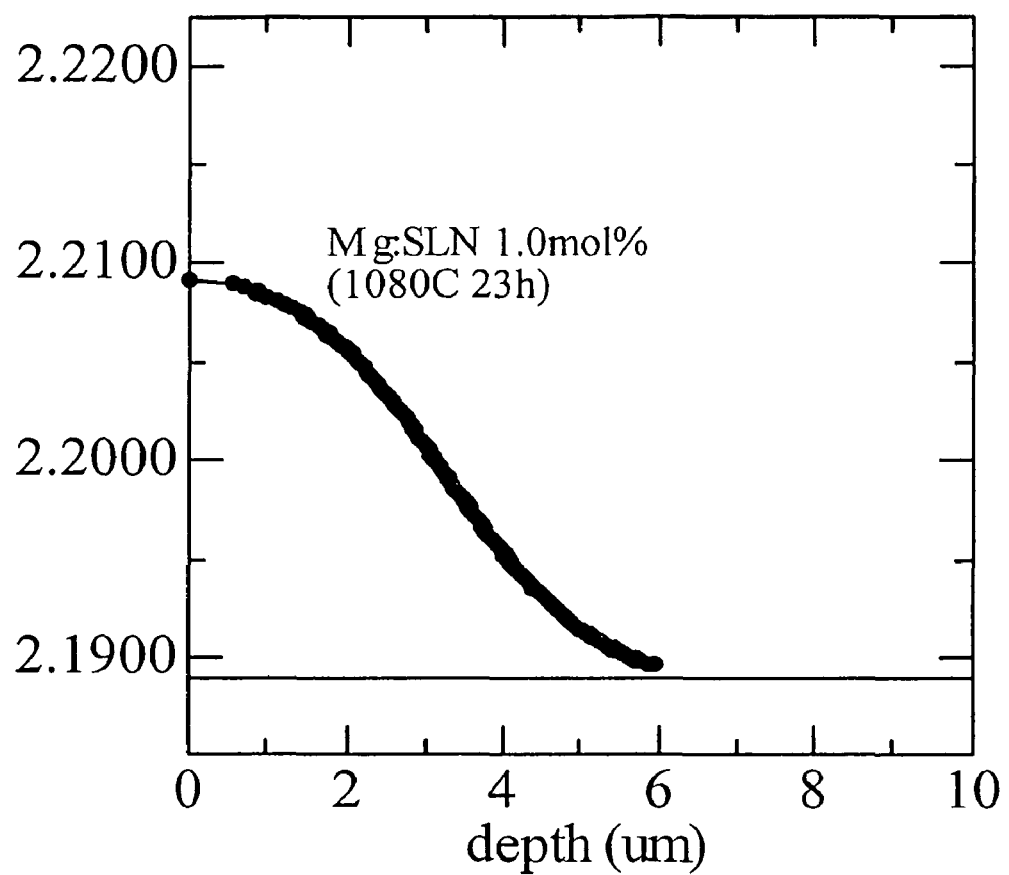
FIG. 3 shows a refractive-index distribution related to an optical device (Example 1b) according to the present invention.
Figure 4:
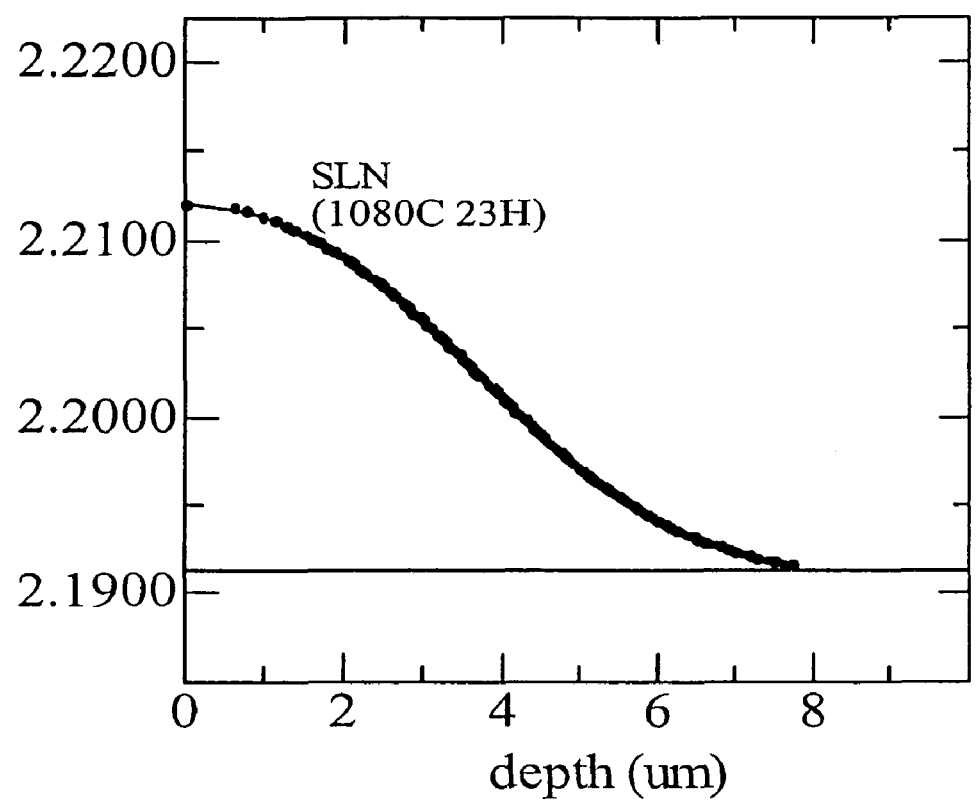
FIG. 4 shows a refractive-index distribution related to an optical device (Example 2) according to the present invention.
Figure 5:
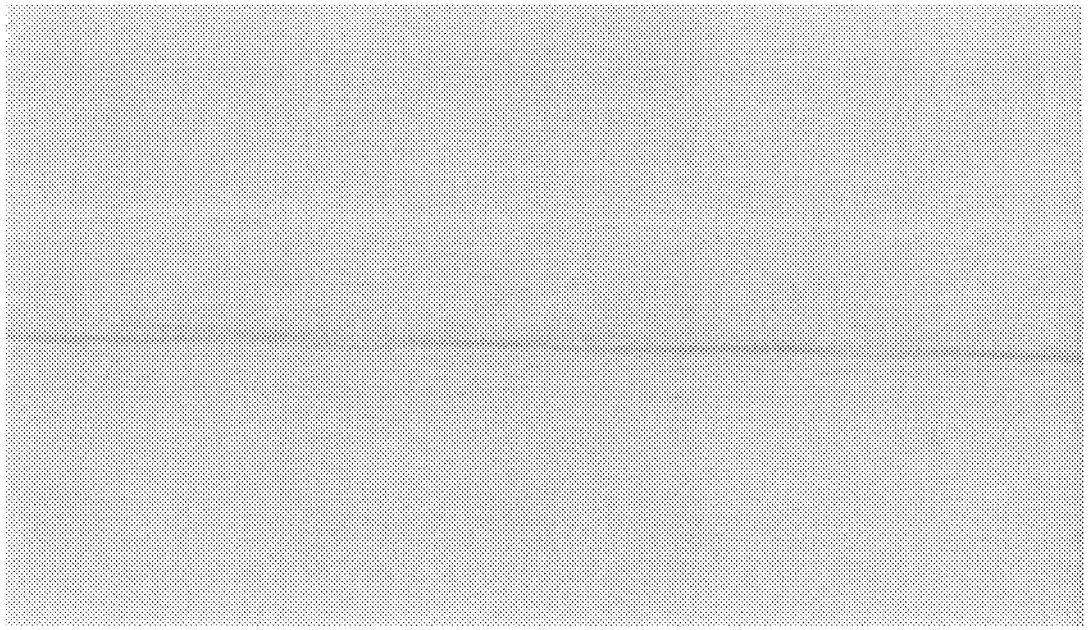
Figure 6:
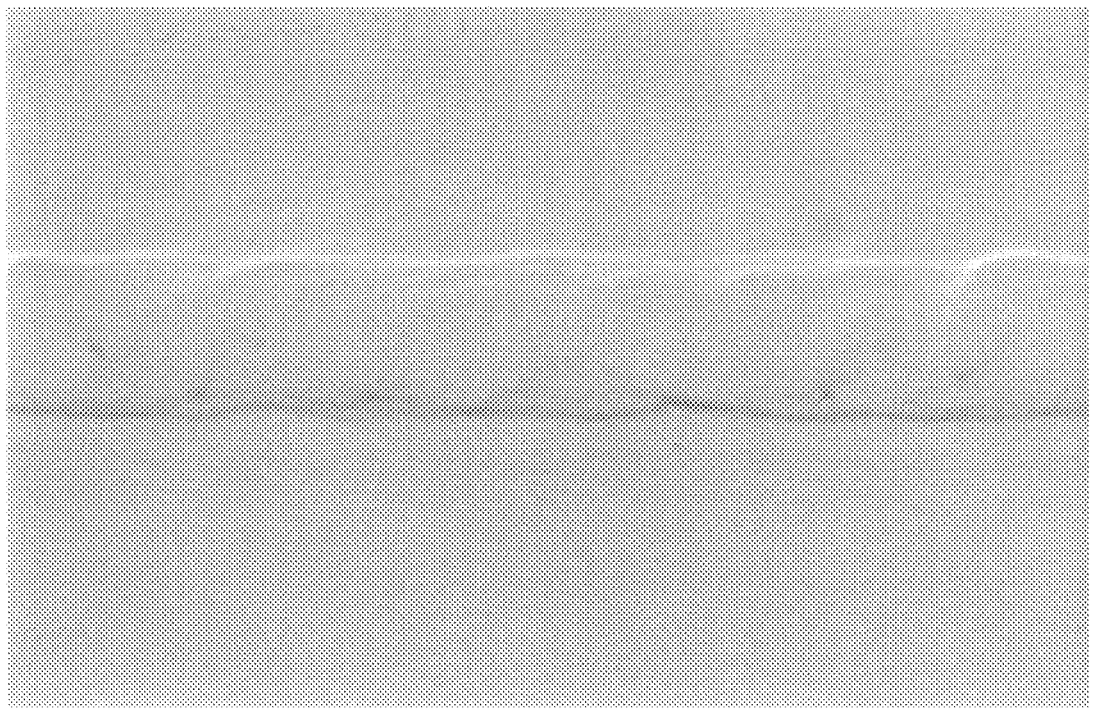
FIG. 6 is a micrograph of a surface of a channel-type waveguide of Example 1b.
Figure 7:
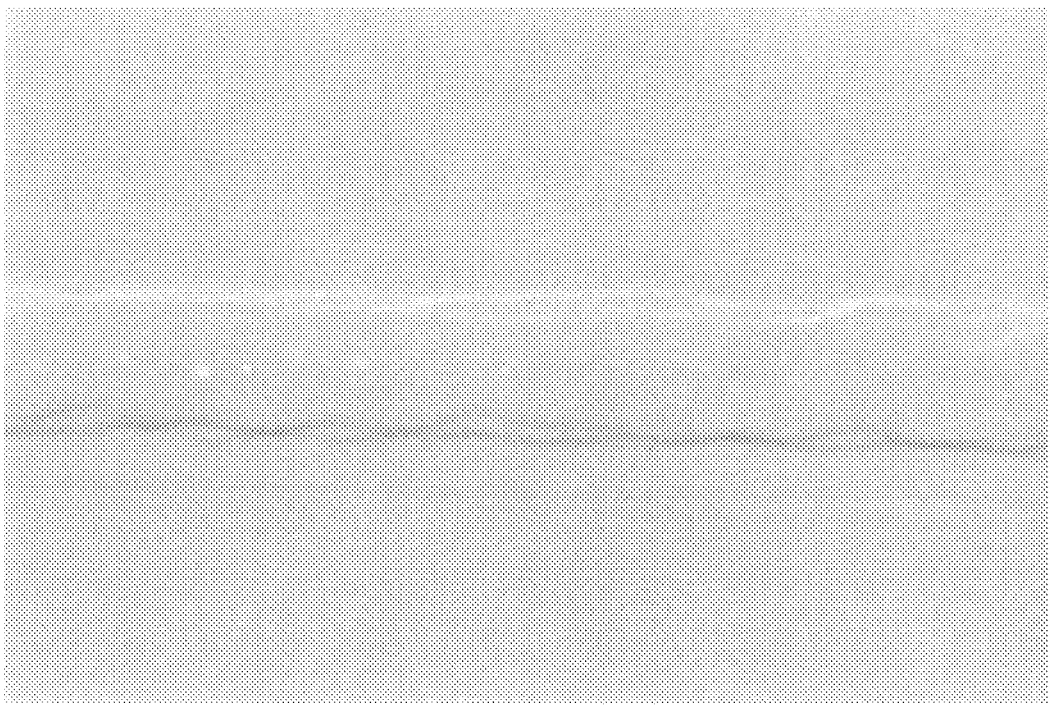
FIG. 7 is a micrograph of a surface of a channel-type waveguide of Example 2.

FIGS. 2 to 4 show refractive-index distributions calculated by the inverse WKB method from the measured values obtained by measuring efficient refractive indexes of guided modes in a slab diffusion region using a the prism coupling method. In addition, a place where the change in the refractive index Δne of the substrate surface becomes 1/e is shown in Table 3 as a dopant diffusion depth de. Furthermore, FIGS. 2, 3 and 4 show Example 1a, Example 1b, and Example 2, respectively. Vertical axes in the drawings denote a refractive index.

TABLE 3

| Sample | | Δne | de (μm) |
|---|---|---|---|
| Example 1a | 1.8 mol % Mg:SLN | 0.0175 | 3.91 |
| Example 1b | 1.0 mol % Mg:SLN | 0.0203 | 3.77 |
| Comparative example 1a | 1.8 mol % Mg:SLN | 0.0171 | 3.84 |
| Example 2 | SLN | 0.0211 | 4.50 |
| Comparative example 2 | SLN | 0.0221 | 4.43 |
| Comparative example 3a | CLN | 0.0150 | 3.72 |

The prepared optical devices have the change in the refractive index and the diffusion depth enough for functioning as optical waveguides. Accordingly, according to the present invention, the dopant is not suppressed from being diffused and the manufacturing condition is sufficiently practical.

Comparative Example 4 and Test Method 3

Figure 8:
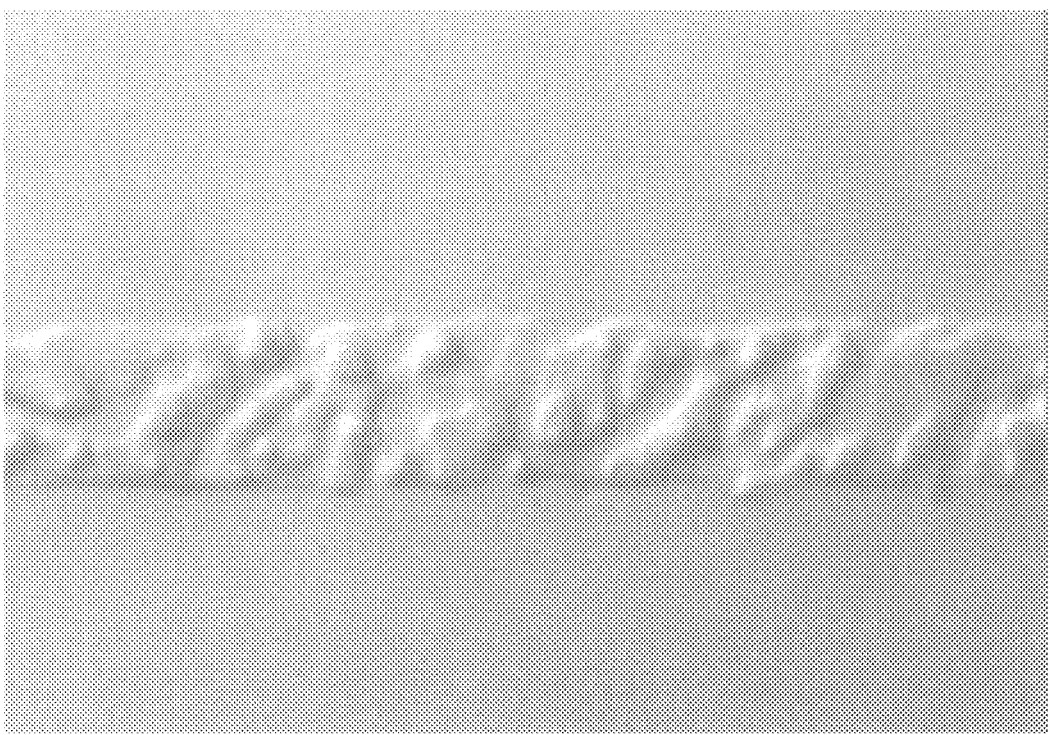
FIG. 8 is a micrograph of a surface of a channel-type waveguide of Comparative example 4.

FIGS. 5 to 8 show micrographs of the surfaces of channel-type waveguides in Example 1a (FIG. 5), Example 1b (FIG. 6), and Example 2 (FIG. 7) of the present invention, and comparative example 4 in which a dopant Ti is diffused into a SLN crystal without using the present invention (diffusion temperature: 990° C., diffusion time: 30 hours, dew-point temperature: 50° C.) (FIG. 8).

It can be seen that irregularities of the surface can be suppressed to form a high-quality waveguide when the present invention is used.

Test Method 4

The below items of the channel-type waveguide obtained by Example 1a were evaluated at a communication waveband (1.55, 1.31 μm). The evaluated items include confirmation of a guided mode by observing the near field pattern (NFP), measurement of insertion loss, and propagation loss by a cutback method.

(1) Evaluation at Wavelength of 1.55 μm and TM Mode

When the thickness of the Ti film is 70 nm, a single mode condition was obtained by setting the width of the optical waveguide (WG) to 5.0 to 8.0 μm. When the thickness of the Ti film is 100 nm, a single mode condition was obtained by setting the width of the optical waveguide (WG) to 3.5 to 7.5 μm. In addition, a waveguide having the insertion loss of a minimum 1.7 dB (the thickness of the Ti film is 100 nm, the width of the optical waveguide (WG) is 4.0 μm, and L=23 mm) and propagation loss of 0.2 dB/cm or less was obtained with good reproducibility.

(2) Evaluation at Wavelength of 1.31 μm and TM Mode

When the thickness of the Ti film is 70 nm, a single mode condition was obtained by setting the width of the optical waveguide (WG) to 4.0 to 7.0 μm. When the thickness of the Ti film is 100 nm, a single mode condition was obtained by setting the width of the optical waveguide (WG) to 3.5 to 5.5 μm. In addition, a waveguide having the insertion loss of a minimum 1.9 dB (the thickness of the Ti film is 70 nm and the width of the optical waveguide (WG) is 4.0 μm) and propagation loss of 0.2 dB/cm or less was obtained with good reproducibility.

As mentioned above, according to the present invention, it is possible to manufacture a practical optical device in a communication waveband. The value of the propagation loss obtained at this time is a minimum, among optical devices using the SLN crystal and Mg:SLN crystal, which have been reported up to now.

Figure 9:
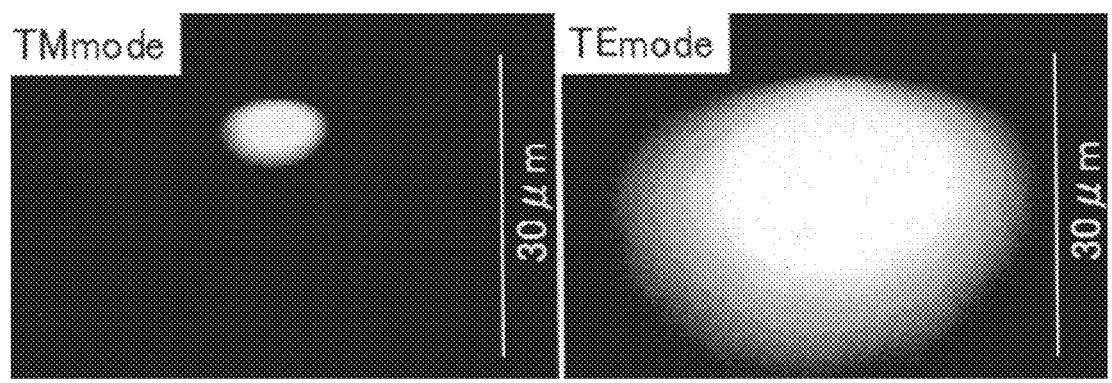
FIG. 9 shows a state of diameters of TM and TE modes related to an optical device according to the present invention.

In the channel-type waveguide obtained by Example 1a, as shown in FIG. 9, the diameters of TM and TE modes are extremely different from that of a Ti diffused waveguide which has been known up to now. In FIG. 9, when the thickness of the Ti film is 100 nm, the width of the optical waveguide (WG) is 7 μm, and the wavelength X of the incident light wave is 1.55 μm, the NFP is observed.

Since coupling efficiency of the TE mode is different from that of the TM mode, an optical device in which a light input/output means such as an optical fiber or a lens is optically coupled to the waveguide functions as an optical waveguide having an extinction function of polarized wave, and it is possible to manufacture a high-value optical device which does not require a polarizer or the like.

Example 5

An optical intensity modulator was manufactured as an optical device using the present invention. The optical modulator has a Mach-Zehnder type optical waveguide interferometer, a buffer layer composed of a dielectric thin film, and a coplanar modulation electrode. The device characteristics of Mg:SLN modulator are shown in Table 4 together with a CLN modulator having the same design. In the Mg:SLN modulator, the insertion loss is 5.0 dB or less and an ON/OFF extinction ratio is 25 dB or more, and a half-wave voltage is smaller than that of the CLN modulator by about 20 percents. In addition, the mode diameter of Table 4 is determined in a range that the optical intensity becomes $1/e^2$ of a maximum value in the optical intensity distribution obtained by an infrared CCD when observing the NFP, and X and Y represent a horizontal direction component and a vertical direction component, respectively.

TABLE 4

|  | Insertion loss (dB) | ON/OFF extinction ratio (dB) | Vπ (1 kHz) (V) | Mode diameter (μm) | |
| --- | --- | --- | --- | --- | --- |
|  |  |  |  | X | Y |
| Mg:SLN | 4.7 | 27.9 | 3.0 | 7.8 | 5.7 |
| CLN | 3.8 | 33.9 | 3.6 | 7.5 | 5.2 |

The extinction ratio of polarized wave of the Mg:SLN modulator was 19 dB or more (The extinction ratio of polarized wave of the CLN is −1.0 dB).

In the modulator using the LN, since the characteristics of the modulator vary depending on a polarization direction of incident light, polarization function is required in the prior art. In general, in order to allow an optical waveguide device to have a polarization function, a separate process for attaching and fixing a polarizer is required. In addition, in this case, it is difficult to provide the polarizer to be accurately matched to an optical axis of the optical waveguide. However, this process can be removed by the present invention and the cost of a module can be reduced or convenience in the use can be improved.

Figure 10:
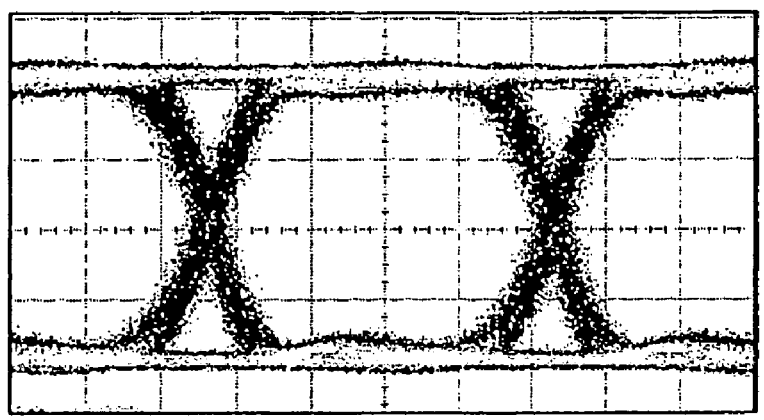
FIG. 10 shows an eye pattern related to an optical device according to the present invention.
Figure 11:
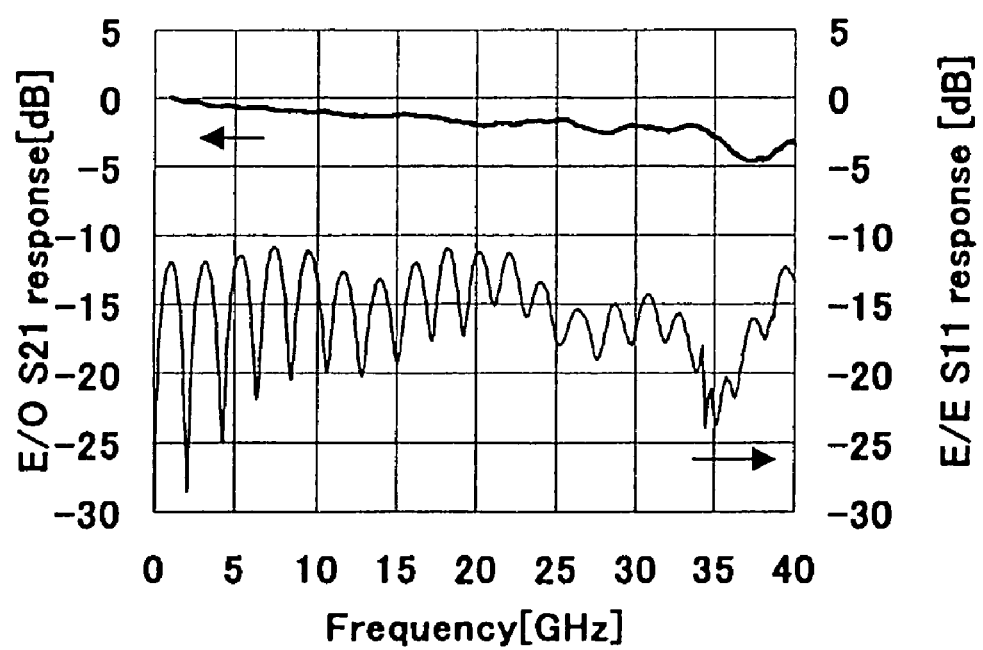
FIG. 11 shows frequency response characteristics related to an optical device according to the present invention.

In addition, FIG. 10 shows an eye pattern of Mg: SLN modulator in 10 Gbps and FIG. 11 shows frequency response characteristics. The aperture of the eye is good and the 3 dB bandwidth of the light is 30 GHz or more. In other words, good high frequency characteristics are confirmed.

As mentioned above, according to the present invention, it is possible to provide an optical device having high quality, excellent productivity and optical characteristics, and capable of suppressing a diffusion temperature and a diffusion time from increasing when a dopant such as Ti is thermally diffused into stoichiometric lithium niobate crystal or a crystal substrate in which Mg is doped into the crystal, and a method of manufacturing the same.

What is claimed is:

1. A method of manufacturing an optical device comprising the steps of:
    forming a dopant layer on a stoichiometric lithium niobate single crystal substrate with Li to Nb mole composition ratio of 49.5% to 50.5%; and
    diffusing a dopant in the dopant layer into at least a portion of the stoichiometric lithium niobate single crystal substrate,
    wherein the stoichiometric lithium niobate single crystal substrate comprises 0.5 to 5 mol % of Mg: and wherein, in the diffusing step, a heat treatment is performed at a diffusion temperature of 1000° C. to 1200° C. for a diffusion time of 3 hours to 24 hours in a dry atmosphere of at least one of $O_2$, $N_2$, Ar and He gas having a dew-point temperature of −35° C. or less.

2. The method of manufacturing an optical device according to claim 1, wherein the dopant layer is composed of at least one selected from the group consisting of Ti, Zn, Ta, Nb, Er, Yb, Ni, Mg, Sc, Cu, and Fe.

3. An optical device comprising a stoichiometric lithium niobate single crystal substrate with Li to Nb mole composition ratio of 49.5% to 50.5% and an optical waveguide formed on the stoichiometric lithium niobate single crystal substrate,
    wherein the stoichiometric lithium niobate single crystal substrate comprises 0.5 to 5 mol % of Mg; the optical waveguide is formed by forming a dopant layer on a stoichiometric lithium niobate single crystal substrate with Li to Nb mole composition ratio of 49.5% to 50.5%, and diffusing a dopant in the dopant layer into at least a portion of the stoichiometric lithium niobate single crystal substrate; and
    wherein, in the diffusing step, a heat treatment is performed at a diffusion temperature of 1000° C. to 1200° C. for a diffusion time of 3 hours to 24 hours in a dry atmosphere of at least one of $O_2$, $N_2$, Ar and He gas having a dew-point temperature of −35° C. or less.

4. The optical device according to claim 3, wherein the dopant layer is composed of at least one selected from the group consisting of Ti, Zn, Ta, Nb, Er, Yb, Ni, Mg, Sc, Cu, and Fe.

5. The optical device according to claim 4, wherein the dopant layer comprises Ti.

6. The optical device according to claim 5, wherein the optical device is adapted to modulate or switch a polarized wave having an extraordinary light component.

7. A method of manufacturing an optical device comprising the step of performing a heat treatment on a stoichiometric lithium niobate single crystal substrate with Li to Nb mole composition ratio of 49.5% to 50.5% at a heating temperature of 1000° C. to 1200° C. for a diffusion time of 3 hours to 24 hours in a dry atmosphere of at least one of $O_2$, $N_2$, Ar and He gas having a dew-point temperature of −35° C. or less in order to remove or reduce process distortion,
    wherein the stoichiometric lithium niobate single crystal substrate comprises 0.5 to 5 mol % of Mg.

* * * * *